June 29, 1948.  E. W. MILHIZER  2,444,305
SHOCK ABSORBING TOW BAR
Filed March 15, 1946  3 Sheets-Sheet 3
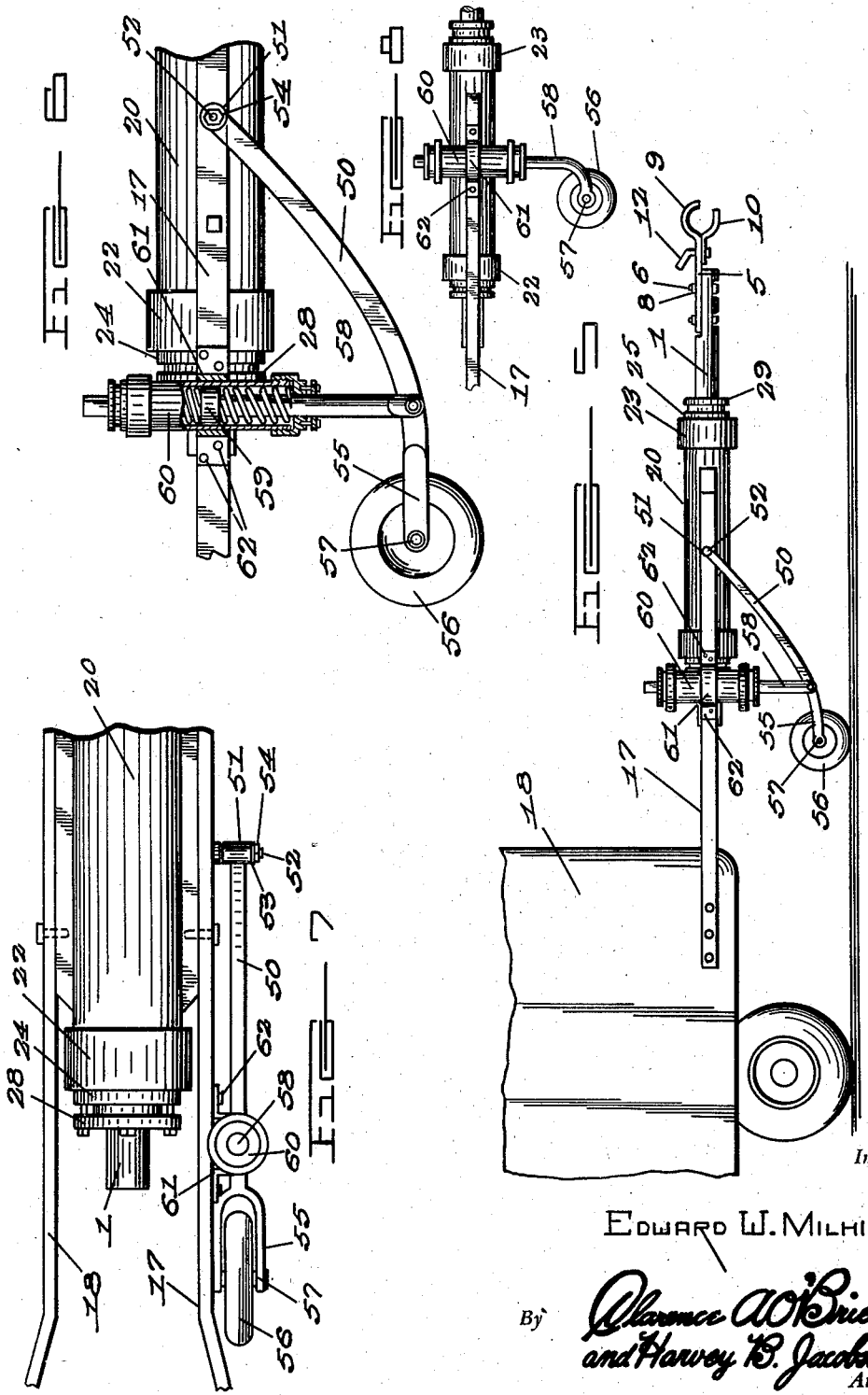
Inventor
EDWARD W. MILHIZER Patented June 29, 1948

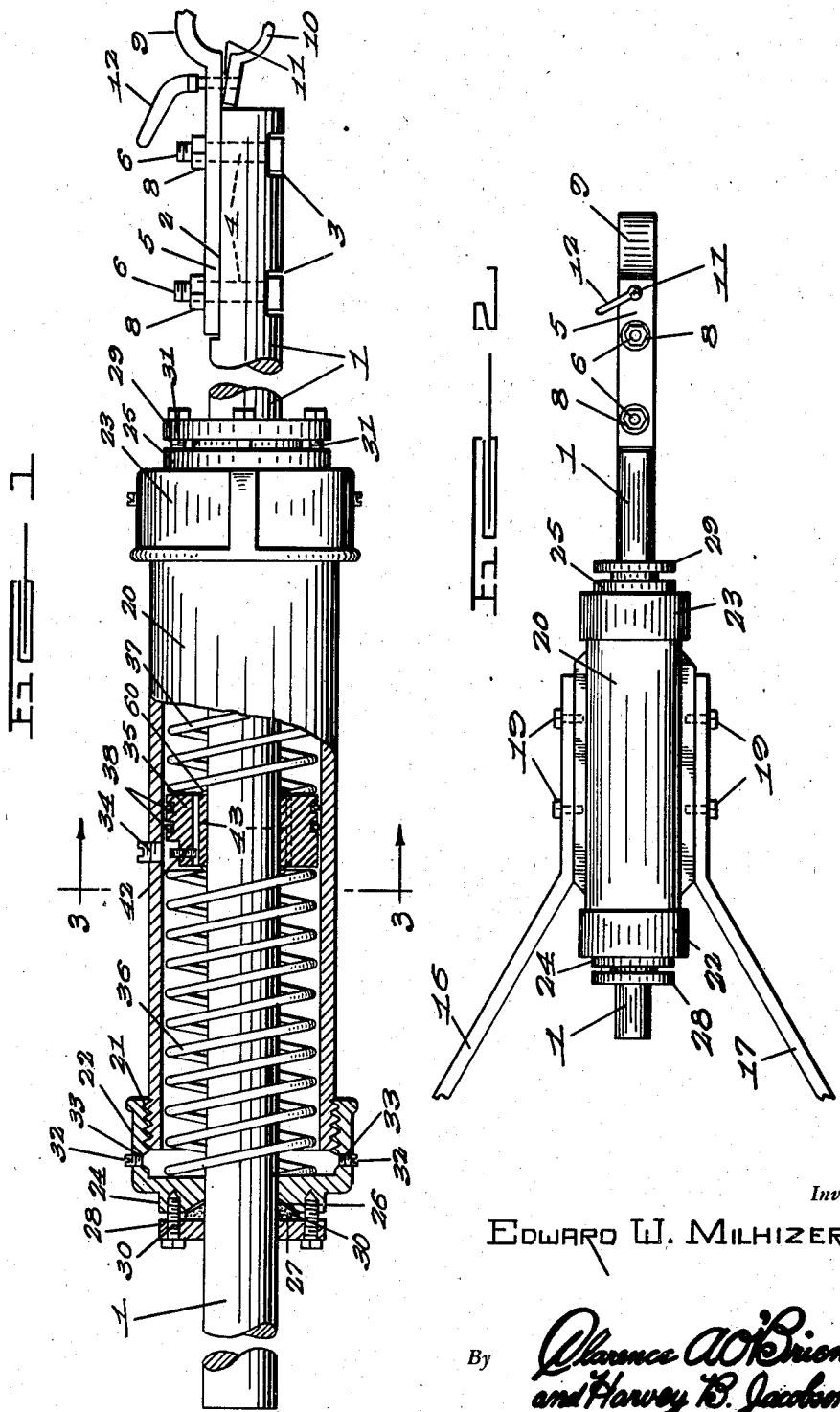

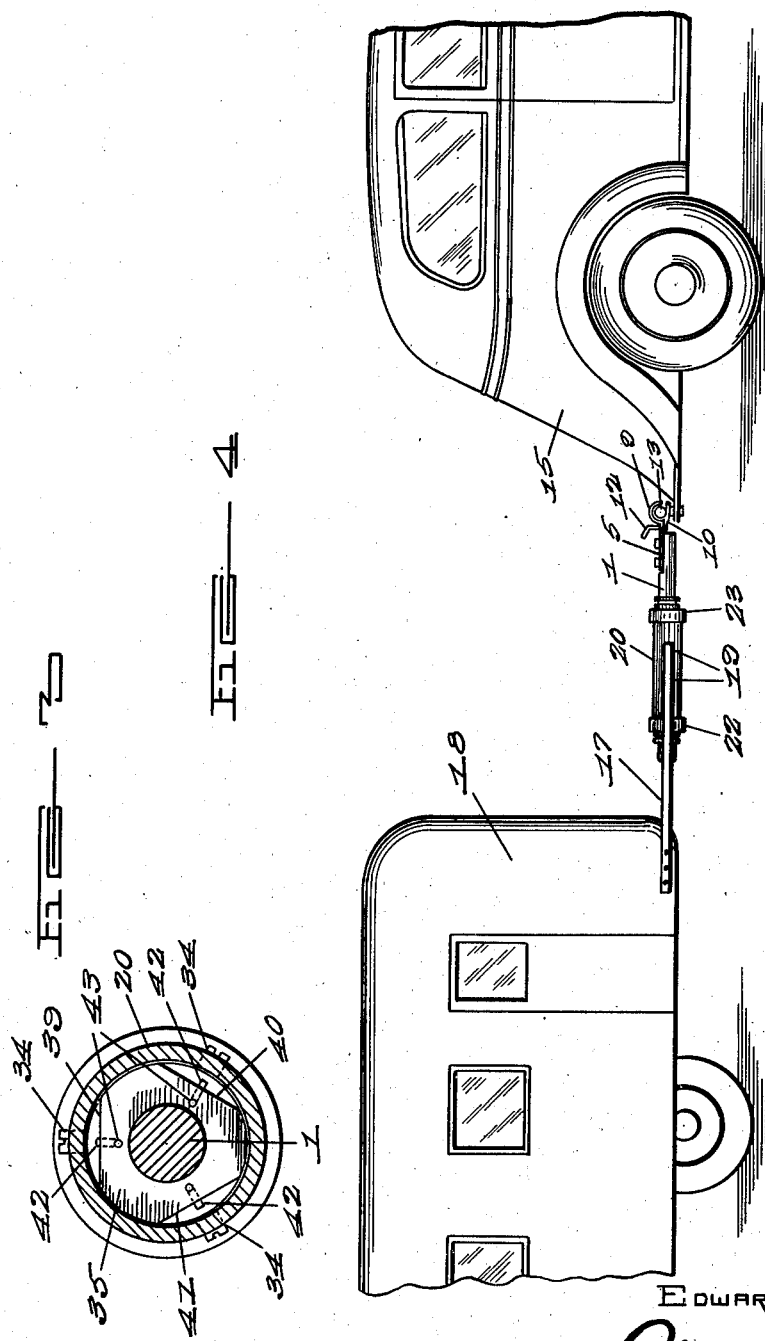

2,444,305

UNITED STATES PATENT OFFICE 2,444,305

SHOCK ABSORBING TOW BAR

Edward W. Milhizer, Lakeland, Fla.

Application March 15, 1946, Serial No. 654,720

4 Claims. (Cl. 280—33.9)

This invention relates to improvements in trailer two bar units used for connecting trailers to an automobile for pulling the same.

An object of the invention is to provide an improved trailer tow bar unit adapted to be connected between a trailer and an automobile used for pulling said trailer, and including a trailer bar adapted to be secured to the ball hitch at the back of an automobile and slidably supporting a ported piston slidably mounted within an oil containing cylinder attached to and supported by the trailer tow arms fixed on the trailer.

Another object of the invention is to provide an improved fluid operated cylinder and piston connection between a trailer and an automobile for pulling said trailer and taking up the shocks incident to travelling upon the highways.

Another object of the invention is to provide an improved trailer tow bar unit including an adjustable fluid operated anti-shock mechanism disposed between a trailer and an automobile to which the trailer is connected, wherein the valve ports through which the fluid passes may be controlled for properly cushioning the shocks from trailers weighing from one ton to approximately fifteen tons.

Another object of the invention is to provide an improved trailer tow bar and third wheel shock absorber unit which will include a forked arm pivotally attached to the trailer tow bar and pivotally supporting a cooperating vertically movable shaft having a fixed piston thereon operable in a fluid containing shock absorbing cylinder, and said wheel being supported at the lower end of the forked arm for engagement with the ground.

A still further object of the invention is to provide an improved fluid operated cylinder and piston trailer tow bar unit for attachment between a trailer and its towing automobile which will be highly efficient in operation, and relatively inexpensive to manufacture and produce.

Other objects will appear as the description proceeds.

In the accompanying drawings which form a part of this application,

Figure 1 is a side elevation of the improved trailer tow bar unit being partially broken away to show the interior workings thereof in section;

Figure 2 is a top plan view of the improved trailer tow bar unit;

Figure 3 is a sectional view taken on the line 3—3 of Figure 1;

Figure 4 is a side elevation of a portion of a trailer and an automobile showing the improved trailer tow bar unit connected therebetween;

Figure 5 is a side elevation of the improved trailer tow bar and third wheel shock absorbing unit shown attached to a trailer;

Figure 6 is a side elevation partly in section of the third wheel shock absorbing unit;

Figure 7 is a top plan view of the improved trailer tow bar and third wheel shock absorbing unit, and Figure 8 is a side elevation showing another positioning of the third wheel shock absorber unit.

Like characters of reference are used throughout the following specification and the accompanying drawing to designate corresponding parts.

In carrying out the invention, there is provided a round tow bar 1 formed with a seat 2 at the top of its forward end and a pair of spaced slots 3 which connect with the apertures 4 formed through the bar 1. A clamp plate 5 is secured on the seat 2 by means of the bolts 6 extending through the apertures 4 in the bar 1 with the bolt heads 7 seating in the slots 3. Nuts 8 are screwed on the bolts 6 to hold the clamp plate 5 in position. A round clamp jaw 9 is formed on the forward end of the plate 5 and a second adjustable jaw 10 is supported on the plate 5 by means of an adjustable clamp bolt 11 having an operating handle 12, said jaws 9 and 10 being adapted to clamp over the ball connection 13 secured to the trailer hitch 14 on the rear end of the automobile 15, whereby the trailer tow bar unit may be detached from the automobile.

The opposite forwardly and inwardly extending tow arms 16 and 17 are secured to the opposite front ends of the trailer 18 and are either welded or secured by means of the bolts 19 to the opposite sides of the fluid and piston cylinder unit 20.

The cylinder 20 is threaded at both ends as at 21, and is adapted to receive the internally threaded cap head members 22 and 23 on its opposite ends. The members 22 and 23 are reduced as at 24 and 25, and are formed with the dished recesses 26 in which the packing 27 is adapted to be received. The centrally apertured end washer members 28 and 29 are secured to the reduced ends 24 and 25 of the cap members 22 and 23 by means of the bolts 30 and 31 extending through said washer members and threaded into said reduced ends.

The round tow bar 1 secured to the automobile 15 extends through the cylinder 20 and end head members and cap members and terminates a distance to the rear of said cylinder 20. Threaded plugs 32 extend through the threaded apertures 33 in said head members 22 and 23 for draining the oil (not shown) from the interior of said cylinder 20 when desired, and larger filling plugs 34 are provided adjacent the central portion of the cylinder 20, which serves dual functions later to be described.

A piston 35 is welded to the tow bar 1 and normally is positioned within the cylinder 20 about mid-way of its length, while coil springs 36 and 37 are disposed about the tow bar 1 between the inner surfaces of the head members and the opposite ends of the piston 35, for holding the parts of the unit in approximate central or neutral position with the piston approximately mid-way in the cylinder.

The piston 35 is provided with a pair of piston rings 38, and is reduced at its rear end to the form of an approximate triangle, and is provided with flattened surfaces 39, 40 and 41, through which the adjusting screws 42 extend into the three longitudinally extending oil passages 43 formed through the pistons to permit the oil to pass through the same as the pistons and draw bar move back and forth in the cylinder as the variations in pull occur between the automobile and the trailer as it is drawn over the highway. The adjusting of the screws 42 into the oil passages 43 restricts the passages and provides less space for the oil to pass therethrough, consequently increasing the action or shock absorbing action of the unit. The screws 42 may be reached for making the adjustments by removing the plugs 34 which are directly over the said screws 42.

It will be understood that the cylinder 20 will be filled full of oil, and when the unit is connected between the trailer and the automobile for pulling the same, it will be in condition for immediate and efficient operation.

It has been found desirable to provide means for cushioning the heavy blows or impacts given the front end of large trailers when their wheels hit holes in the road or run over rough roads. Accordingly, there is provided a curved downwardly and rearwardly extending arm 50 having a bearing eye 51 adapted to be received over the laterally extending stud or arm 52 supported on the side of the trailer tow arms 17. A washer 53 will be placed over the threaded outer end of the arm 52 and a lock nut 54 will be screwed in place to hold the arm 50 so that it will not accidentally come loose from the arm support 52.

A fork 55 will be formed at the lower end of the arm 50, and will support the ground engaging wheel 56 mounted on the axle 57 between the arms of said fork.

The vertically reciprocating shock absorber rod 58 will be pivotally connected to the arm 50 adjacent its fork 55 and will extend upwardly therefrom, supporting the fixed piston 59, similar to the piston 35 in the piston cylinder 20.

A piston cylinder 60 similar in every detail to the cylinder 20 is provided, but is smaller in size and is mounted vertically on the side of the trailer tow arm 17 slightly to the rear of the cylinder 20, and is held in position by the U-shape clamping strap or member 61 positioned about it, and held in place by means of the bolts 62.

Thus, the shock absorbing piston cylinder unit 20 absorbs the longitudinal shocks, while the shock absorbing piston cylinder 60 absorbs the vertical shocks as the third wheel drops into holes and rough places in the road.

It will be apparent that there has been devised a highly efficient form of fluid or hydraulic trailer tow bar unit which may be adjusted to efficiently and automatically operate with various sizes of trailers.

While the preferred embodiment of the instant invention has been illustrated and described, it will be understood that it is not intended to limit the scope of the invention thereto, as many minor changes in detail of construction may be resorted to without departure from the spirit of the invention.

Having thus described my invention, what I claim as new and desire to secure by Letters Patent of the United States is:

1. A trailer tow bar unit including a cylinder adapted to be fixed to a trailer and a cylinder tow bar adapted to be fixed to an automobile and extending longitudinally through said cylinder, removable heads for said cylinder, packing in said heads, a ported piston secured to said bar operable in said cylinder, fluid in said cylinder, means for filling and draining said cylinder, coil springs in said cylinder disposed about said bar at the opposite sides of said piston, and means in radial alignment with said filling means for adjusting the effective size of the ports in said piston for controlling the amount of fluid passing through said ports as said piston is moved lengthwise in said cylinder.

2. A trailer tow bar unit including a cylinder adapted to be fixed to a trailer and a cylinder tow bar adapted to be fixed to an automobile and extending longitudinally through said cylinder, removable heads for said cylinder, packing in said heads, a ported piston secured to said bar intermediate its ends operable in said cylinder, fluid in said cylinder, means for filling and draining said cylinder, coil springs in said cylinder disposed about said bar at the opposite sides of said piston, and means in radial alignment with said filling means for adjusting the effective size of the ports in said piston for controlling the amount of fluid passing through said ports as said piston is moved lengthwise in said cylinder.

3. A trailer tow bar unit including a cylinder adapted to be fixed to a trailer and a cylinder tow bar adapted to be fixed to an automobile and extending longitudinally through said cylinder, removable heads for said cylinder, packing in said heads, a ported piston secured to said bar intermediate its ends operable in said cylinder, piston rings on said piston, fluid in said cylinder, means for filling and draining said cylinder, coil springs in said cylinder disposed about said bar at the opposite sides of said piston, and means in radial alignment with said filling means comprising a threaded screw disposed transversely of the port in said piston for adjusting the effective size thereof for controlling the amount of fluid passing through said port as a piston is moved lengthwise in said cylinder.

4. A trailer tow bar unit including a cylinder adapted to be fixed to a trailer and a cylinder tow bar adapted to be fixed to an automobile and extending longitudinally through said cylinder, removable heads for said cylinder, packing in said heads, a ported piston formed with a plurality of longitudinally extending ports secured to said bar intermediate its ends operable in said cylinder, fluid in said cylinder, piston rings on said piston, means for filling and draining said cylinder, coil springs in said cylinder disposed about said bar at the opposite sides of said piston, and means including radially extending threaded screws disposed transversely of said ports arranged in radial alignment with said filling means for adjusting the effective size of the ports in said piston for controlling the amount of fluid passing through said ports as said piston is moved lengthwise in said cylinder.

EDWARD W. MILHIZER.

REFERENCES CITED

The following references are of record in the file of this patent:

UNITED STATES PATENTS

| Number | Name | Date |
|---|---|---|
| 1,933,387 | Patterson | Oct. 31, 1933 |
| 2,023,527 | Johansen | Dec. 10, 1935 |
| 2,162,029 | Paul | June 13, 1939 |